G. W. BOLL.
APPARATUS FOR DRYING GRAIN IN BINS OR GRANARIES.
APPLICATION FILED APR. 1, 1910.

1,020,256.

Patented Mar. 12, 1912.

Witnesses
C. N. Walker.
J. T. Walker.

Inventor
George W. Boll
By Edson Bro's,
Attorneys

UNITED STATES PATENT OFFICE.

GEORGE W. BOLL, OF WICHITA, KANSAS.

APPARATUS FOR DRYING GRAIN IN BINS OR GRANARIES.

1,020,256.

Specification of Letters Patent.

Patented Mar. 12, 1912.

Application filed April 1, 1910. Serial No. 552,839.

*To all whom it may concern:*

Be it known that I, GEORGE W. BOLL, a citizen of the United States, residing at Wichita, in the county of Sedgwick and State of Kansas, have invented certain new and useful Improvements in Apparatus for Drying Grain in Bins or Granaries; and I do hereby declare the following to be a full, clear, and exact description of the invention, such as will enable others skilled in the art to which it appertains to make and use the same.

My invention relates to the drying of grain in bins or granaries.

It has for its object to provide for drying grain in storage bins without the necessity of manipulating or turning said grain whereby from one to five cents per bushel, which is the usual cost of reconditioning the grain, is saved, and the risk of the grain spoiling on account of dampness is reduced to a minimum.

My invention is especially applicable to metal granaries.

The process which I employ is based upon the theory of evaporation rather than ventilation. I dry the grain by utilizing the heat absorbed by the walls of the bin. Owing to the well known principle that warm air ascends, the air inside of the bin next to the walls thereof will be caused to circulate upwardly when said walls are heated by the rays of the sun. In order to create a circulation throughout the whole body or mass of grain in the bin, I provide a reservoir in the center and supply it with cool air. The top of the reservoir is closed to prevent the escape of the cool air in that direction. The sides of the reservoir, however, are perforated so that the air is distributed laterally in all directions. These radial currents of cool air are drawn through the grain by the attraction of the drafts of warm air ascending around the inner surface of the wall. The result will be a continuous circulation of air from the center to the outside of the bin as long as the walls are warmer than the interior of the bin. In winter, the action of the drier is reversed, the air being drawn from the colder exterior of the bin to the reservoir and discharged through the top of the latter which is then left uncovered.

The invention also consists in the features of construction and combinations of parts hereinafter described and specified in the claims.

Figure 1:
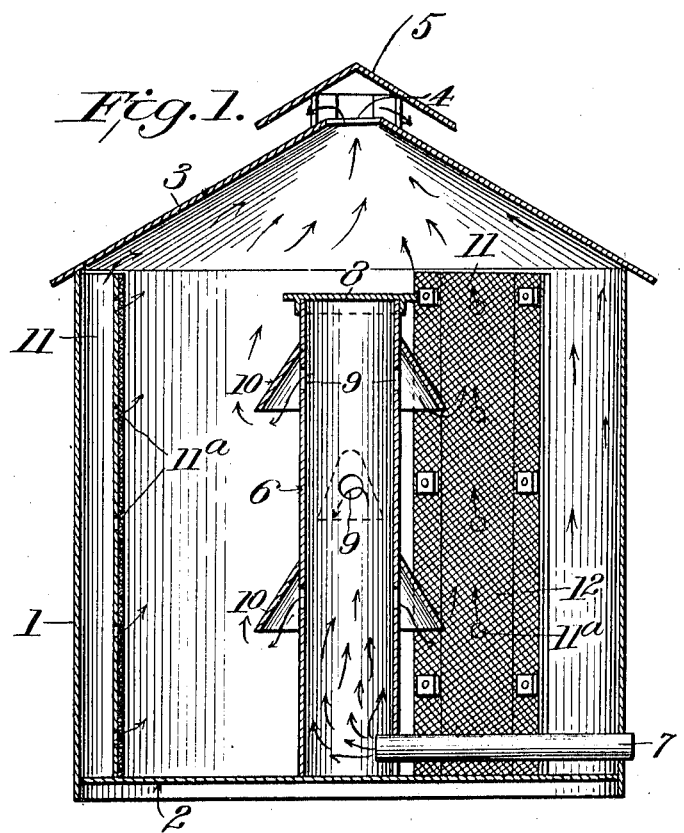
Figure 2:
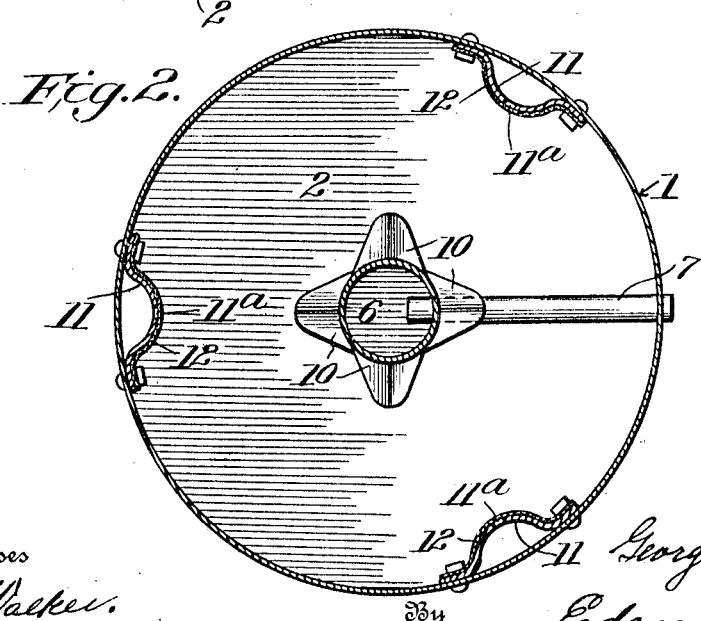

In the accompanying drawing: Figure 1 is a central vertical section of a grain bin equipped with my drying apparatus, and Fig. 2 is a horizontal section thereof.

Referring more particularly to the drawing, 1 designates the walls of a metal grain bin, 2 the bottom or floor thereof, and 3 the roof. An opening 4 is left at the apex of the roof for exit of the air after it has circulated through the grain. This opening is protected by a cap or canopy 5.

The reservoir 6 in the center of the bin may be cylindrical in form. Cool air is supplied to the reservoir in any suitable way, as for instance by the pipe 7 running along the bottom of the bin and opening through the wall near the base thereof. The closure 8 at the top of the reservoir is made removable in order that it may be taken off in cold weather for reversing the action of the drier, as already explained. The perforations 9 in the sides of the reservoir are covered by hoods 10 which project below their respective perforations and serve to prevent the grain from entering through them into said reservoir.

Secured to the inner surface of the wall of the bin at suitable intervals are flues 11 which may be made of strips of sheet metal bent into semi-circular form and secured at their edges to the wall. Said flues are perforated, as at 11ª, and in order to prevent the grain passing through said perforations, they are preferably covered with wire gauze 12. The upper ends of the flues are left open so as to discharge the air just below the roof, whereupon it escapes through the opening 4 in its apex.

As already intimated, in warm weather, the closure or cap is placed upon the reservoir and the circulation of air, caused by the walls of the bin being heated by the sun's rays, will be first into the reservoir through the pipe 7, thence from the reservoir through the grain to the flues 11, and thence up said flues to the space below the roof where it escapes through the opening 4. In cold weather, the circulation of the air is reversed. In other words, in summer the grain is dried from the circumference of the bin to the center, whereas in the winter the drying is done from the center to the circumference.

I do not limit myself to the details of construction herein shown and described but reserve the right to make such changes as fairly fall within the scope of my invention. For instance, while I have shown three flues on the interior surface of the wall, a greater or less number may be used, as may be found desirable, without departing from the spirit or sacrificing the advantages of my invention.

I claim:

1. The combination, with a grain bin having imperforate sides, and a roof having an opening therein, of a perforated air reservoir in said bin, means of communication between the lower end of said reservoir and the air on the exterior of the bin, a closure for the top of said reservoir, and perforated flues on the inner surface of the walls of the bin, said flues opening below the roof.

2. The combination, with a grain bin having imperforate sides, and a roof having an opening therein, of a perforated air reservoir arranged in said bin below and in line with the opening in the roof, means of communication between the lower end of said reservoir and the exterior of the bin, a closure for the top of said reservoir and perforated flues on the inner surface of the walls of said bins, said flues opening below the roof.

3. The combination, with a grain bin having imperforate sides, and a pitched roof provided with an opening in its apex, of a perforated air reservoir arranged in the bin below and in line with the opening in the roof and extending substantially the full height of the walls of the bin, means of communication between the lower end of said reservoir and the exterior of the bin, a closure for the top of said reservoir and perforated flues on the inner surface of the walls of said bins, said flues extending substantially the full height of the walls of the bin and opening below the roof.

4. The combination, with a grain bin having imperforate sides and a conical roof provided with a nopening in its apex, of a perforated air reservoir arranged in the center of the bin immediately below the opening in the roof and extending substantially the full height of the walls of the bin, means of communication between the lower end of said reservoir and the exterior of the bin, a closure for the top of said reservoir, and perforated flues on the inner surface of the walls of said bin, said flues extending substantially the full height of the walls of the bin and opening below the roof whereby the air from the reservoir is obliged to percolate through the contents of the bin and pass up through said flues to reach the outlet in the roof.

In testimony whereof, I affix my signature, in presence of two witnesses.

GEORGE W. BOLL.

Witnesses:
A. J. ADAMS,
GEO. E. DUSER.

Copies of this patent may be obtained for five cents each, by addressing the "Commissioner of Patents, Washington, D. C."